US010879768B2

(12) United States Patent
Nishifukumoto et al.

(10) Patent No.: US 10,879,768 B2
(45) Date of Patent: Dec. 29, 2020

(54) ELECTRIC MOTOR WITH FAN MOTOR

(71) Applicant: FANUC CORPORATION, Yamanashi (JP)

(72) Inventors: Akira Nishifukumoto, Yamanashi (JP); Akira Yamaguchi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 289 days.

(21) Appl. No.: 15/606,741

(22) Filed: May 26, 2017

(65) Prior Publication Data
US 2017/0264168 A1 Sep. 14, 2017

Related U.S. Application Data

(63) Continuation of application No. 14/685,749, filed on Apr. 14, 2015, now abandoned.

(30) Foreign Application Priority Data

Apr. 16, 2014 (JP) .................................. 2014-084877

(51) Int. Cl.
H02K 9/04 (2006.01)
H02K 5/20 (2006.01)

(52) U.S. Cl.
CPC ................. H02K 9/04 (2013.01); H02K 5/20 (2013.01)

(58) Field of Classification Search
CPC ............ H02K 9/06; H02K 5/225; H02K 9/02; H02K 9/04; H02K 5/22; H02K 5/20
USPC ............... 310/58, 59, 60 R, 62, 63
See application file for complete search history.

(56) References Cited

U.S. PATENT DOCUMENTS

| 1,808,845 | A | | 9/1931 | Gifford et al. | |
|---|---|---|---|---|---|
| 2,787,720 | A | | 4/1957 | Ethier et al. | |
| 4,352,037 | A | * | 9/1982 | Santner | F03B 13/105 220/686 |
| 5,076,762 | A | * | 12/1991 | Lykes | F04D 13/08 310/59 |
| 5,763,969 | A | | 6/1998 | Metheny et al. | |
| 5,780,946 | A | * | 7/1998 | Nakamura | F04D 25/082 310/58 |
| 2007/0133169 | A1 | * | 6/2007 | Lin | H05K 7/20172 361/695 |

(Continued)

FOREIGN PATENT DOCUMENTS

| DE | 1488025 A1 | 8/1969 |
|---|---|---|
| DE | 69509604 T2 | 1/2000 |
| DE | 202009016903 U1 | 4/2010 |

(Continued)

OTHER PUBLICATIONS

JP 53113308 U (Sep. 1978) English Translation.*

(Continued)

Primary Examiner — Tulsidas C Patel
Assistant Examiner — Robert E Mates
(74) Attorney, Agent, or Firm — Fredrikson & Byron, P.A.

(57) ABSTRACT

An electric motor comprising: an motor main body, a fan motor for cooling the motor main body, and a casing which is attached to the motor main body to hold the fan motor, wherein the fan motor has engagement parts, and both of the motor main body and the casing are provided with engagement parts which can engage with the engagement parts on the fan motor to fasten the fan motor.

5 Claims, 4 Drawing Sheets

(56) References Cited

U.S. PATENT DOCUMENTS

2009/0263259 A1* 10/2009 Picton .................. H02K 7/1815
417/364
2013/0175892 A1* 7/2013 Buttner .................. H02K 9/06
310/63

FOREIGN PATENT DOCUMENTS

| EP | 2065126 A1 | | 6/2009 |
|---|---|---|---|
| JP | 53113308 U | * | 9/1978 |
| JP | 5841052 U1 | | 1/1983 |
| JP | 02068659 U | * | 5/1990 |
| JP | H0476152 U | | 7/1992 |
| JP | 7245913 A | | 9/1995 |
| JP | 114559 A | | 1/1999 |
| JP | 200594949 A | | 4/2005 |
| JP | 2008271654 A | | 11/2008 |

OTHER PUBLICATIONS

JP02068659U1 (May 1990) English Translation.*
English Machine Translation for German Publication No. 202009016903 U1, published Apr. 8, 2010, 9 pgs.
English Machine Translation for German Publication No. 69509604 T2, published Jan. 13, 2000, 2 pgs.
English Machine Translation for German Publication No. 1488025 A1, published Aug. 28, 1969, 3 pgs.
Untranslated Decision to Grant a Patent mailed by Japanese Patent Office on Mar. 29, 2016 for Japanese Patent Application No. 2014-84877, 3 pgs.
Translated Decision to Grant a Patent mailed by Japanese Patent Office on Mar. 29, 2016 for Japanese Patent Application No. 2014-84877, 3 pgs.
Brief English explanation of JP H04-76152 U, published Jul. 2, 1992, 1 pg.
English Abstract and Machine Translation for Japanese Publication No. 2008-271654 A, published Nov. 6, 2008, 8 pgs.
English Abstract and Machine Translation for Japanese Publication No. 2005-094949 A, published Apr. 7, 2005, 7 pgs.
English Abstract and Machine Translation for Japanese Publication No. 11-004559 A, published Jan. 6, 1999, 13 pgs.
English Abstract and Machine Translation for Japanese Publication No. 07-245913 A, published Sep. 19, 1995, 10 pgs.
English Machine Translation for Japanese Publication No. 58-041052 U1, published Jan. 1, 1983, 3 pgs.
English Summary for Japanese Publication No. 53113308 U, published Sep. 9, 1978, 1 pg.

* cited by examiner

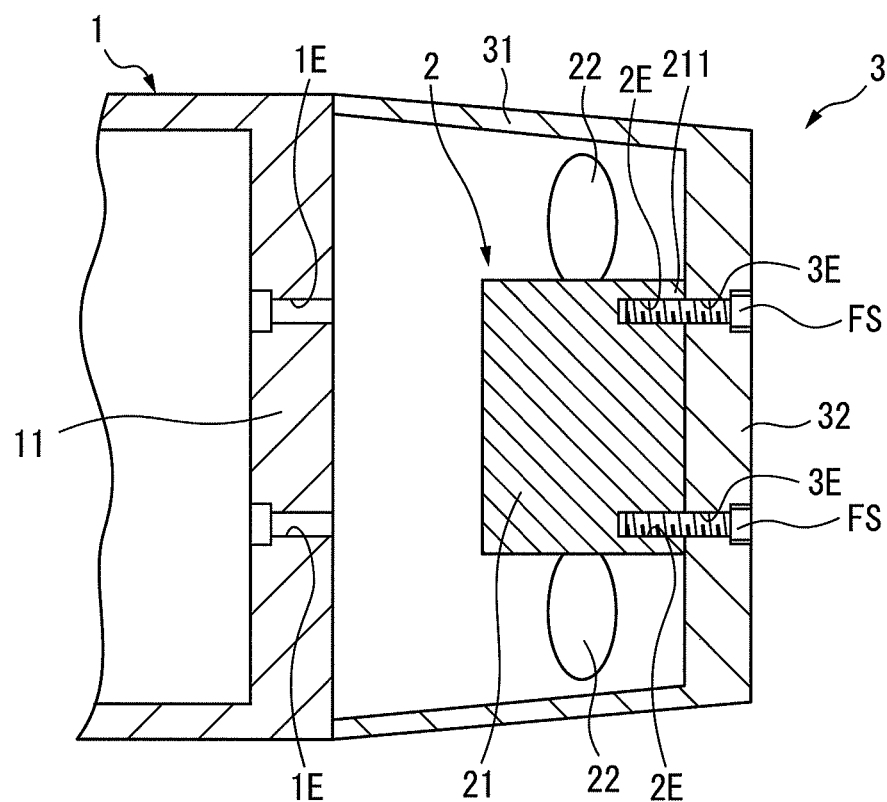
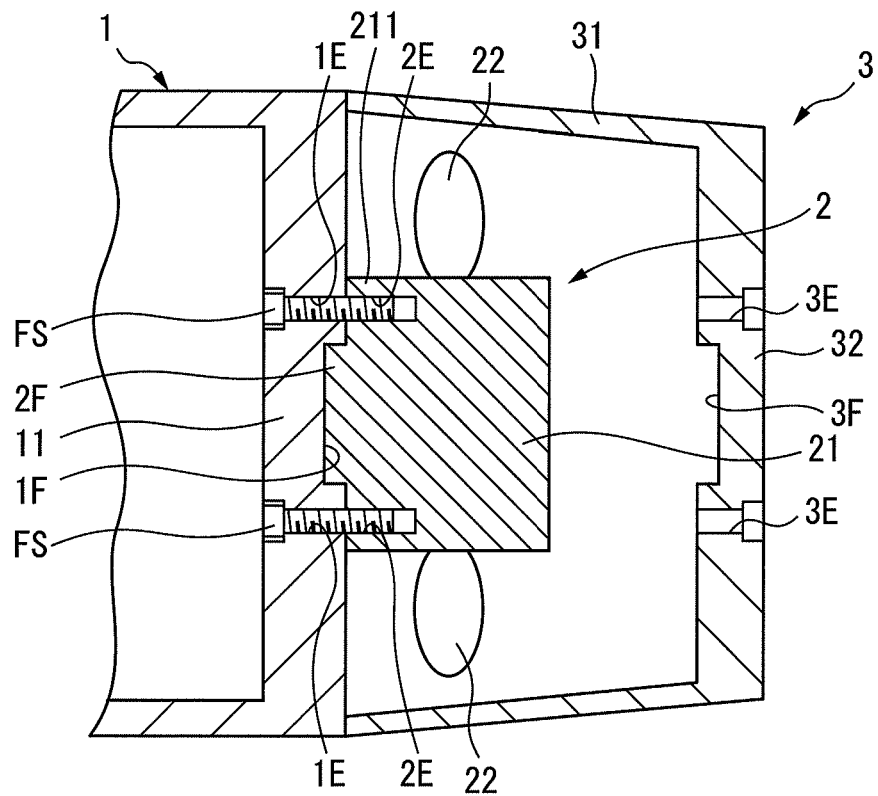

ELECTRIC MOTOR WITH FAN MOTOR

RELATED APPLICATIONS

This application is a continuation of application Ser. No. 14/685,749, filed Apr. 14, 2015, which claims priority to Japanese Application No. 2014-084877, filed Apr. 16, 2014, the teachings of all of which are incorporated herein by reference.

BACKGROUND OF THE INVENTION

1. Field of the Invention

The present invention relates to an electric motor with a fan motor.

2. Description of the Related Art

Air-cooled type of electric motors are known in the prior art, and these electric motors have built-in fan motors which are driven by a dedicated drive sources. As the mounting positions of the fan motors in such electric motors, two may be adopted: the outside wall of the motor main body, and the inside wall of the casing which holds the fan motor. JP-U-H04-76152 illustrates an electric motor which employs the former mounting position. More specifically, JP-U-H04-76152 discloses a squirrel cage type motor comprising a fan motor which is fastened to anti-load side brackets of the motor main body. If a fan motor is mounted to a motor main body in this way, the mounting part of the fan motor has improved rigidity, and therefore it is possible to mitigate the vibration which is transmitted from the load device through the motor main body to the fan motor. However, mounting a fan motor to an motor main body involves a tremendous amount of work such as fastening the casing, fastening the fan motor, and connecting the wiring of the fan motor, and therefore the assembly work of the fan motor is complicated. Similarly, replacing a fan motor involves a tremendous amount which is associated with detachment and reattachment of the fan motor, resulting in prolongation of the replacement work.

On the other hand, when mounting a fan motor to a casing, it is also possible to employ a unit structure incorporating a fan motor, casing, and fan motor wiring. This allows for handling in modular units, and therefore it is possible to greatly reduce the work of assembly and replacement of the fan motor. However, when mounting a fan motor to a casing, the mounting part of the fan motor has lower rigidity, and therefore vibration transmitted to the fan motor from the load device may cause resonance in the fan motor, resulting in breakage of the fan motor or casing when the fan motor is mounted to the casing. In this way, there are both advantages and disadvantages to both of the above two mounting positions. Therefore, the user of an electric motor had to select the mounting position of the fan motor in consideration of the usage conditions and vibration states of the load device etc. However, it is difficult to know in advance the usage conditions and vibration states of a load device etc., and therefore the user can leans whether or not the selected mounting position is suitable only after the load device has been operated. Further, changing the mounting position of a fan motor during operation of a load device involves replacing not only the fan motor, but also the electric motor as a whole, and therefore the load on the user is greater both in terms of cost and work.

An electric motor which can adjust to various usage conditions and vibration states of a load device has therefore been sought.

SUMMARY OF INVENTION

According to a first aspect of the present invention, there is provided an electric motor comprising: a motor main body, a fan motor for cooling the motor main body, and a casing which is attached to the motor main body to hold the fan motor, wherein the fan motor has engagement parts, and both of the motor main body and the casing are provided with engagement parts which can engage with the engagement parts on the fan motor to fasten the fan motor.

According to a second aspect of the present invention, there is provided an electric motor in the first aspect, wherein the engagement parts on the fan motor are provided on only one of the two end faces of the fan motor in the blowing direction of the fan motor, and the engagement parts on the motor main body and the engagement parts on the casing have common structures with each other.

According to a third aspect of the present invention, there is provided an electric motor in the first aspect, wherein the engagement parts on the fan motor are provided on both of the two end faces of the fan motor in the blowing direction of the fan motor.

According to a fourth aspect of the present invention, there is provided an electric motor in any of the first to third aspects, wherein the fan motor has fitting parts which can fit with both the motor main body and the casing.

According to a fifth aspect of the present invention, there is provided an electric motor in the fourth aspect, wherein the fitting parts are formed on both of the two end faces of the fan motor in the blowing direction of the fan motor.

These and other objects, features, and advantages of the present invention will become clearer with reference to the detailed description of illustrative embodiments of the present invention which are shown in the attached drawings.

BRIEF DESCRIPTION OF THE DRAWINGS

FIG. 3 shows a state where the fan motor in the electric motor of FIG. 2 is fastened not to a motor main body but to the casing.

FIG. 4 is a partially enlarged view similar to FIG. 2 which shows a cross-section of a casing and the location in the electric motor of the second embodiment of the present invention.

DETAILED DESCRIPTION OF EMBODIMENTS

Below, embodiments of the present invention will be explained in detail with reference to the drawings. Note that the following explanation does not limit the technical scope of the inventions which are described in the claims or the meaning of terms etc.

Figure 1:
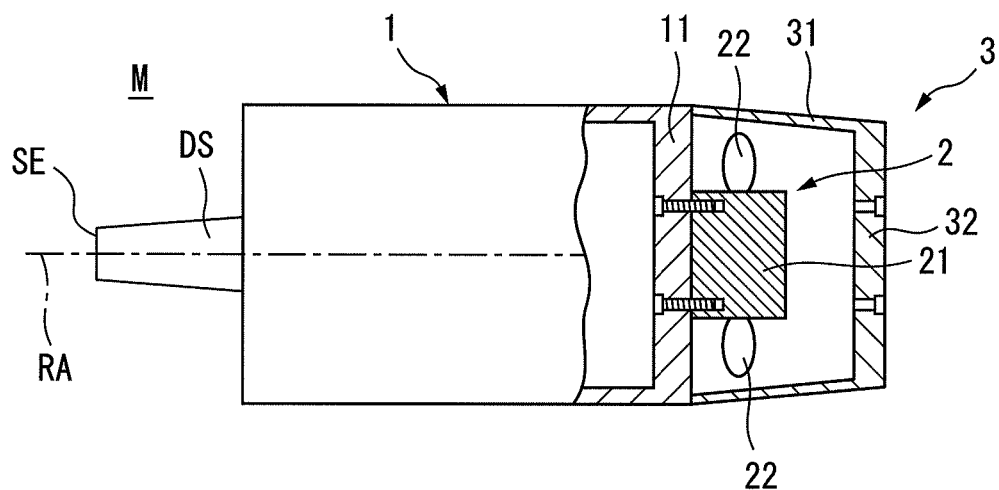
FIG. 1 is a partially cut away side view of an electric motor of a first embodiment of the present invention.
Figure 2:
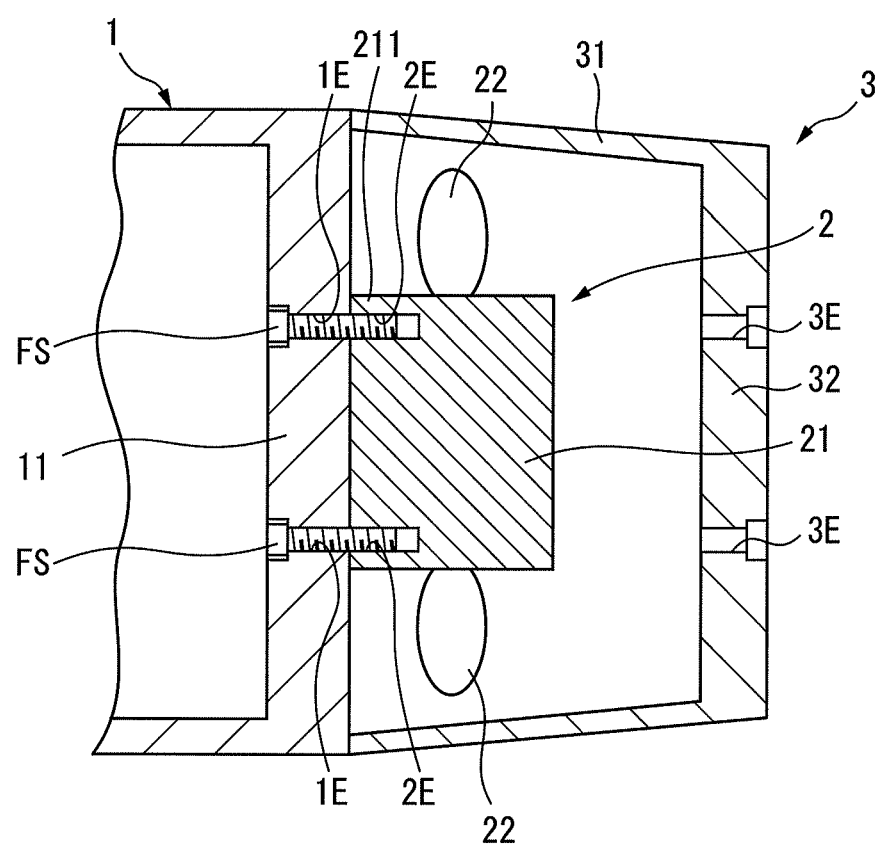
FIG. 2 is a partially enlarged view of FIG. 1 and shows a cross-section of a casing and the location in the electric motor of FIG. 1.

Referring to FIG. 1 to FIG. 3, an electric motor of a first embodiment of the present invention will be explained. FIG. 1 is partially cut away side view of an electric motor M of the present embodiment. In FIG. 1, only a casing and its vicinity are shown by cross-section. As shown in FIG. 1, the electric motor M of the present example comprises an motor main body 1 which has a drive shaft DS, a fan motor 2 for cooling the motor main body 1, and a casing 3 which holds the fan motor 2. These will be explained in order below. First, the motor main body 1 of the present example is a rotary type motor for outputting drive force which is generated by interaction of a rotor and stator (not shown) in the form of rotational motion of the drive shaft DS. As shown in FIG. 1, the motor main body 1 has a columnar outer shape which extends in the left-right direction in the figure. The drive shaft DS projects from one end face of the motor main body 1 in the direction of extension to the outside of the motor main body 1. Further, the front end SE of the drive shaft DS in its projecting direction is connected to a driven shaft of the machine tool or peripheral equipment or other load device (not shown). Below, the end part of the motor main body 1 near the front end SE in the direction parallel to the rotational axis RA of the drive shaft DS may be called the "output side end part", while the end part of the motor main body 1 on the opposite side to the output side end part may be called the "anti-output side end part".

Next, the fan motor 2 of the present example comprises a body part 21 which has a columnar outer shape which extends in the left-right direction of the figure and has a built-in dedicated motor and a cooling fan 22 which is attached to the drive shaft of the motor in the body part 21. The mounting structure of the fan motor 2 in the electric motor M of the present example will be explained later. Further, the fan motor 2 of the present example is configured so that the motor inside the body part 21 drives rotation of the cooling fan 33 and thereby the cooling fan 22 blows air in a direction parallel to the direction of extension of the body part 21 (that is, the left-right direction in the figure). In this way, the fan motor 2 has the function of discharging the heat which is generated during operation of the motor main body 1 to outside of the motor main body 1, and thereby cooling the motor main body 1. The heat generated by the electric motor M is mainly due to copper loss, iron loss, and other electrical loss which may occur in the stator, and mechanical loss which may result from the friction acting on the rotor. Note that, the motor inside of the body part 21 can rotate in both of the forward direction and reverse direction. It is possible to reverse the direction of progression of the cooling air by switching the rotation direction of the motor. Next, the casing 3 of the present example has a tubular body part 31 which extends in the left-right direction in the figure, and a closing part 32 which closes one end part of the body part 31 in the extension direction. Further, the end part on the opposite side to the closed part 32 in the direction of extension of the body part 31 is attached to the end part 11 on the anti-output side of the motor main body 1.

Next, the mounting structure of a fan motor 2 in the electric motor M of the present example will be explained. FIG. 2 is a partially enlarged view of FIG. 1 and shows a cross-section of a casing 3 and its vicinity in the electric motor M of FIG. 1. As shown in FIG. 2, one end 211 in the direction of extension of the body part 21 of the fan motor 2 is provided with a plurality of engagement parts 2E which have the form of female threads. Such engagement parts 2E may be referred to below as the "fan motor 2 side engagement parts 2E". Further, the anti-output side end part 11 of the motor main body 1 is provided with a plurality of engagement parts 1E which can engage with the fan motor 2 side engagement part 2E to fasten the fan motor 2. Engagement part 1E may be referred to below as the "motor main body 1 side engagement parts 1E". As shown in FIG. 2, the motor main body 1 side engagement parts 1E have the forms of through holes formed by counterboring, and fastening screws FS can be inserted into the through holes to fasten the fan motor 2. Further, the fastening screws FS inserted into the motor main body 1 side engagement parts 1E are further inserted into the fan motor 2 side engagement parts 2E so that the fan motor 2 is fastened to the anti-output side end part 11 of the motor main body 1.

Continuing reference to FIG. 2, it is learned that in addition to the end part 11 of the motor main body 1, the closing part 32 of the casing 3 is also provided with a plurality of engagement parts 3E which can engage with the fan motor 2 side engagement parts 2E to fasten the fan motor 2. These engagement parts may be referred to below as the "casing 3 side engagement parts 3E". The casing 3 side engagement parts 3E have common structures with the above-mentioned motor main body 1 side engagement parts 1E. That is, the casing 3 side engagement parts 3E have the forms of through holes formed by counterboring. The number and arrangement of the casing 3 side engagement parts 3E are similar to the number and arrangement of the motor main body 1 side engagement parts 1E. In this way, the electric motor M of the present example has engagement parts which can engage with the fan motor 2 side engagement parts 2E so as to fasten the fan motor 2 at both the motor main body 1 and the casing 3.

FIG. 3 is a partial enlarged view similar to FIG. 2 and shows a state where the fan motor 2 in the electric motor M of FIG. 2 is fastened not to the motor main body 1 but to the casing 3. As shown in FIG. 3, in order to fasten the fan motor 2 to the casing 3, it is necessary to reverse the orientation of the fan motor 2 so that the fan motor 2 side engagement parts 2E face the casing 3 side engagement parts 3E. Further, the fastening screws FS inserted into the casing 3 side engagement parts 3E are further inserted into the fan motor 2 side engagement parts 2E so that the fan motor 2 is fastened to the closing part 32 of the casing 3. Note that, in the state of FIG. 3, the orientation of the fan motor 2 with respect to the motor main body 1 is inverted in comparison with the state of FIG. 2, and therefore it is necessary to switch the direction of rotation of the fan motor 2 to reverse the direction of progression of the cooling air. As will be understood from FIG. 2 and FIG. 3, in the electric motor M of the present example, the mounting position of the fan motor 2 can be easily changed between the anti-output side end part 11 of the motor main body 1 and the closing part 32 of the casing 3 even during operation of the load device. Therefore, even if it turns out that the mounting position of the fan motor 2 is not suitable after the start of operation of the load device, it is not necessary to replace the electric motor M entirely with another electric motor.

Next, referring to FIG. 4 and FIG. 5, an electric motor of a second embodiment of the present invention will be explained. The electric motor of the present embodiment has a configuration similar to the electric motor M of the first embodiment explained above except for the parts which are specifically explained below. Therefore, parts which have configurations similar to the first embodiment will be assigned the same reference notations as the first embodiment, and explanations of parts having similar configurations will be omitted.

FIG. 4 is a partially enlarged view similar to FIG. 2 which shows a cross-section of a casing 3 and its vicinity in an illustrative electric motor M of the present embodiment. FIG. 4 shows the state where the fan motor 2 is fastened to the motor main body 1, in the same way as FIG. 2. As shown in FIG. 4, the end part 211 of the body part 21 of the fan motor 2 is provided with not only a plurality of engagement parts 2E, but also a projecting fitting part 2F which projects from the end part 211. Further, the anti-output side end part 11 of the motor main body 1 is provided with not only a plurality of engagement parts 1E, but also a recessed fitting part 1F which can fit with the projecting fitting part 2F. Similarly, the closing part 32 of the casing 3 is provided with not only a plurality of engagement parts 3E, but also a recessed fitting part 3F which can fit with the projecting fitting part 2F. As shown in FIG. 4, when the fan motor 2 is fastened to the motor main body 1, the projecting fitting part 2F of the fan motor 2 is fit into the recessed fitting part 3F of the casing 3.

Figure 5:
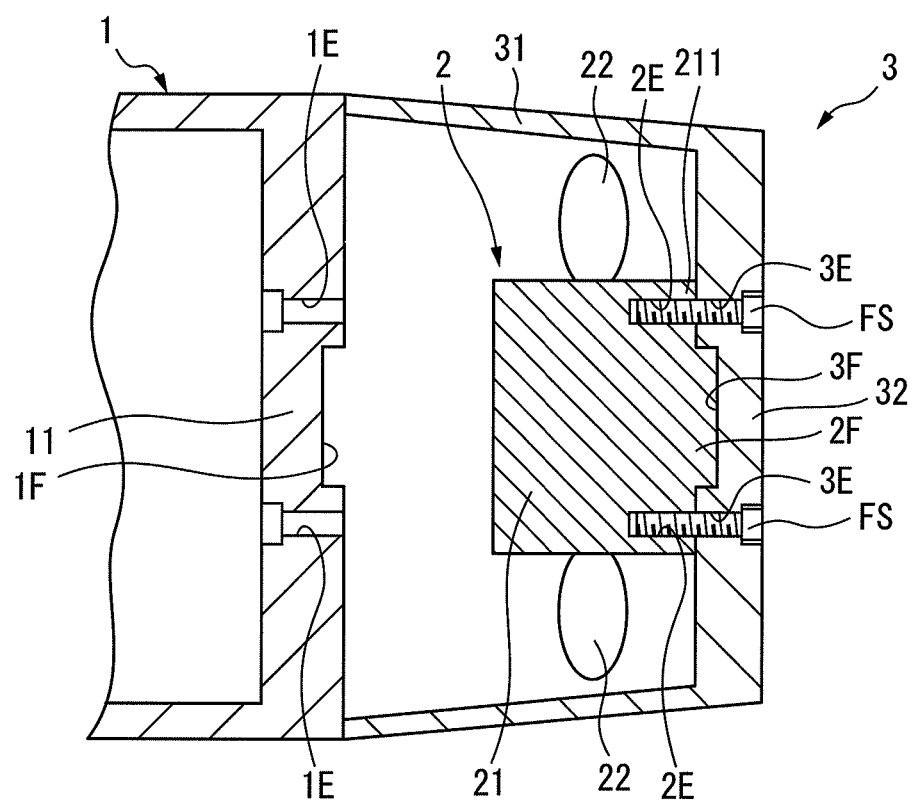
FIG. 5 shows a state where the fan motor in the electric motor of FIG. 4 is fastened not to a motor main body but to the casing.

FIG. 5 is a partially enlarged view similar to FIG. 4 and shows a state where the fan motor 2 in the electric motor M of FIG. 4 is fastened not at the motor main body 1 but to the casing 3. As shown in FIG. 5, when the fan motor 2 is fastened to the casing 3, the projecting fitting part 2F of the fan motor 2 is fit into the recessed fitting part 3F of the casing 3. As will be understood from FIG. 4 and FIG. 5, in the electric motor of the present embodiment M, the static friction force which acts between the projecting fitting part 2F and recessed fitting part 1F or recessed fitting part 3F enables the fan motor 2 to be stably fastened to the motor main body 1 or casing 3. As a result, it is possible to prevent the fastening screws FS from loosening due to vibration which is transmitted from the load device to the motor main body 1 etc., and therefore it is possible to improve the resistance of the electric motor M against vibration which is transmitted from the load device. Note that, in the examples of FIG. 4 and FIG. 5, the fan motor 2 is provided with the projecting fitting part 2F while the motor main body 1 and casing 3 are respectively provided with the recessed fitting parts 1F and 3F. However, the fan motor 2 may also be provided with a recessed fitting part 2F and the motor main body 1 and casing 3 may also be provided with projecting fitting parts 1F and 3F.

Next, referring to FIG. 6 and FIG. 7, an electric motor of a third embodiment of the present invention will be explained. The electric motor of the present embodiment has a configuration similar to the electric motor M of the second embodiment explained above except for the parts which are specifically explained below. Therefore, parts which have configurations similar to the second embodiment will be assigned the same reference notations as the first embodiment, and explanations of parts having similar configurations will be omitted.

Figure 6:
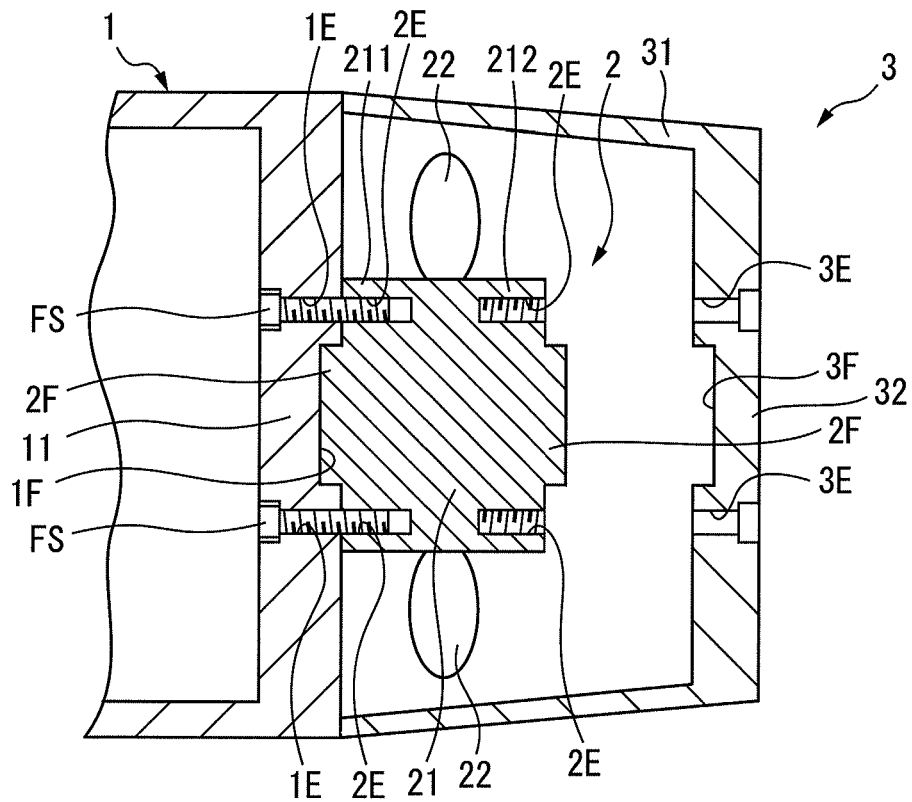
FIG. 6 is a partially enlarged view similar to FIG. 4 which shows a cross-section of a casing and the location in the electric motor of the third embodiment of the present invention.

FIG. 6 is a partially enlarged view similar to FIG. 4 which shows a cross-section of a casing 3 and its vicinity in an illustrative electric motor M of the present embodiment. FIG. 6 shows the state where the fan motor 2 is fastened to the motor main body 1, similar to FIG. 4. As will be understood by comparing FIG. 4 and FIG. 6, in the electric motor of the above-mentioned second embodiment, the fan motor 2 side engagement parts 2E are provided on only one end part 211 in the direction of extension of the body part 21 (that is, the blowing direction of the fan motor 2). However, in the electric motor M of the present embodiment, the fan motor 2 side engagement parts 2E are provided on both of one end part 211 and the other end part 212 of the body part 21 in the blowing direction of the fan motor 2. Similarly, in the electric motor M of the above-mentioned second embodiment, the projecting fitting part 2F is provided on only one end part 211 in the blowing direction of the fan motor 2 (see FIG. 4). However, in the electric motor M of the present embodiment, projecting fitting parts 2F are provided on both one end part 211 and the other end part 212 of the body part 21 in the blowing direction of the fan motor 2. The projecting fitting part 2F and the recessed fitting parts 1F and 3F are additional elements for stabilizing the fastened state of the fan motor 2 in the electric motor M, and therefore they may be omitted.

As shown in FIG. 6, when the fan motor 2 is fastened to the motor main body 1, the engagement parts 2E located on one end part 211 engage with the motor main body 1 side engagement parts 1E. More specifically, the fastening screws FS inserted into the engagement parts 1E having the form of through holes are further inserted into the female thread shaped engagement parts 2E which are provided on the end part 211 so that the fan motor 2 is fastened to the anti-output side end part 11 of the motor main body 1. When the fan motor 2 is fastened in this way, the projecting fitting part 2F which is provided on the end part 211 is fit into the recessed fitting part 1F of the motor main body 1. This ensures that the fastened state of the fan motor 2 to the motor main body 1 is stabilized.

Figure 7:
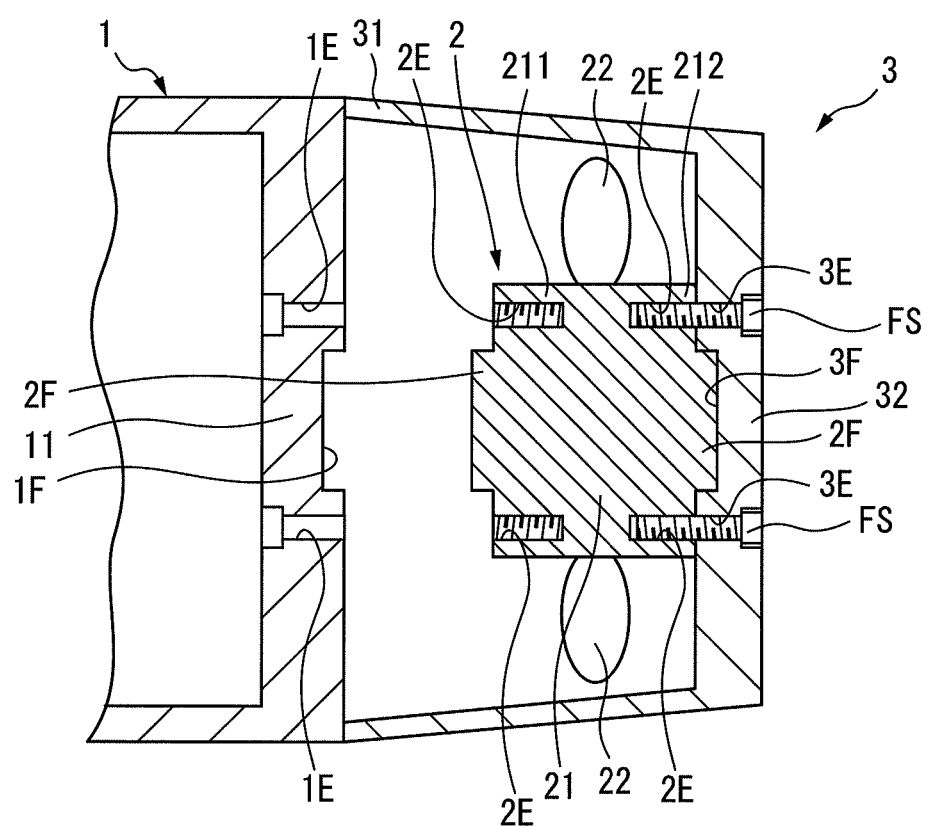
FIG. 7 shows a state where the fan motor in the electric motor of FIG. 6 is fastened not to the motor main body but to the casing.

FIG. 7 is a partially enlarged view similar to FIG. 6 and shows a state where the fan motor 2 in the electric motor M of FIG. 6 is fastened not to the motor main body 1 but to the casing 3. As shown in FIG. 7, when the fan motor 2 is fastened to the casing 3, the engagement parts 2E which are provided on the end part 212 on the opposite side to the end part 211 engage with the casing 3 side engagement parts 3E. More specifically, the fastening screws FS inserted into the engagement parts 3E having the form of through holes are further inserted into the female thread shaped engagement parts 3E which are provided on the opposite side end part 212 so that the fan motor 2 is fastened to the closing part 32 of the casing 3. When the fan motor 2 is fastened in this way, the projecting fitting part 2F which is provided on the opposite side end part 212 is fit into the recessed fitting part 3F of the casing 3. This ensures that the fastened state of the fan motor 2 to the motor main body 1 is stabilized.

In the above way, in the electric motor of the present embodiment M, the engagement parts 2E at the fan motor 2 side are provided on both of the two end parts 211 and 212 of the body part 21, and therefore it is no longer necessary to reverse the orientation of the fan motor 2 with respect to the motor main body 1 even when the mounting position of the fan motor 2 is changed between the motor main body 1 and the casing 3. This ensures that the work of changing the mounting position of the fan motor 2 is simplified. Furthermore, in the electric motor of the present embodiment M, the orientation of the fan motor 2 with respect to the motor main body 1 remains unchanged even after changing the mounting position of the fan motor 2, and therefore it is possible to maintain the cooling efficiency of the fan motor 2 which was achieved before changing the mounting position.

As explained above, according to the above-mentioned first to third embodiments, engagement parts 1E and 3E for fastening the fan motor 2 are provided on both the motor main body 1 and the casing 3, and hence the mounting position of the fan motor 2 can be easily changed between the motor main body 1 and the casing 3 even during operation of the load device. Therefore, the electric motors M of the first to third embodiments are suitable for a variety of usage conditions and vibration states of the load device. Furthermore, according to the first to third embodiments, the structure of the fan motor 2 is commonized regardless of its mounting position, and therefore it is possible to simplify the process of production and maintenance work of the electric motor M.

EFFECT OF INVENTION

According to the first aspect of the present invention, engagement parts for fastening the fan motor are provided on both the motor main body and the casing, and therefore the mounting position of the fan motor can be easily changed between the motor main body and the casing even during operation of a load device. Therefore, according to the first aspect, it is possible to provide an electric motor which can adjust to various usage conditions and vibration states of a load device. Furthermore, according to the first aspect, the structure of the fan motor is commonized regardless of its mounting position, and therefore it is possible to simplify the process of production and maintenance work of the electric motor.

According to the second aspect of the present invention, the engagement parts of the fan motor are provided on only one end face of the fan motor, and therefore it is possible to simplify the process of production of the fan motor.

According to the third aspect of the present invention, the engagement parts of the fan motor are provided on both end faces of the fan motor, and therefore it is possible to change the mounting position of the fan motor without reversing the orientation of the fan motor with respect to the motor main body. Therefore, according to the third aspect, even after changing the mounting position of the fan motor, it is possible to maintain a cooling efficiency similar to that before changing the mounting position. Furthermore, according to the third aspect, it is possible to simplify the work of changing the mounting position of the fan motor.

According to the fourth aspect of the present invention, the fan motor is stably fastened to the motor main body or the casing, due to the static friction force which acts between the fitting parts of the fan motor and the motor main body or casing. Therefore, according to the fourth aspect, it is possible to improve the resistance of the electric motor against vibration which is transmitted from a load device.

According to the fifth aspect of the present invention, fitting parts of the fan motor are provided on both end faces of the fan motor, and therefore it is possible to stabilize the fastened state of the fan motor no matter whether the fan motor is fastened to the motor main body or the casing.

The present invention is not limited to the above-mentioned embodiments and can be modified in various ways within the scope described in the claims. For example, in the above-mentioned embodiments, the casing 3 for holding the fan motor 2 is attached to the end part 11 of the motor main body 1 on the anti-load side. However, the casing 3 in the electric motor M of the present invention may also be attached to another location of the motor main body 1, for example, the outer circumferential surface of the motor main body 1. Furthermore, the casing 3 in the electric motor M of the present invention may also be attached to the motor main body 1 through adapters or brackets or other attachment members instead of being attached directly to the motor main body 1. Further, the dimensions, shapes, materials, etc. of the above-mentioned parts are only examples. Various dimensions, shapes, materials, etc., can be employed for achieving the effects of the present invention.

The invention claimed is:

1. An electric motor comprising:
a motor main body,
a fan motor for cooling said motor main body, and
a casing which is attached to said motor main body to hold said fan motor, wherein
said fan motor has a plurality of engagement parts comprising female threads, and
both of said motor main body and said casing are each provided with a corresponding plurality of engagement parts (1E, 3E) comprising through holes, wherein the plurality of engagement parts on the fan motor align with either the plurality of engagement parts on the motor main body or casing so that a plurality of bolts can be received in either the plurality of engagement parts of the motor main body or casing and engage the plurality of engagement parts of the fan motor to fasten said fan motor to either the main motor body or casing.

2. The electric motor according to claim 1, wherein
the engagement parts on said fan motor are provided on only one of the two end faces of said fan motor in a blowing direction of said fan motor, and
the engagement parts on said motor main body and the engagement parts on said casing have common structures with each other.

3. The electric motor according to claim 1, wherein the engagement parts on said fan motor are provided on both of the two end faces of said fan motor in the blowing direction of said fan motor.

4. The electric motor according to claim 1, wherein
said fan motor has fitting parts which can fit with both said motor main body and said casing.

5. The electric motor according to claim 4, wherein
said fitting parts are formed on both of two end faces of said fan motor in the blowing direction of said fan motor.

* * * * *